July 1, 1969     A. J. SLEMMONS     3,452,702
VEHICLE PROPULSION SYSTEM
Filed Sept. 5, 1967     Sheet 1 of 4
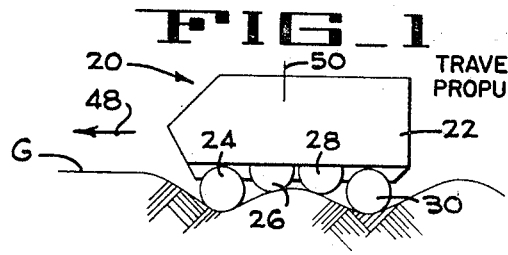
FIG_1 — TRAVELING WAVE PROPULSION
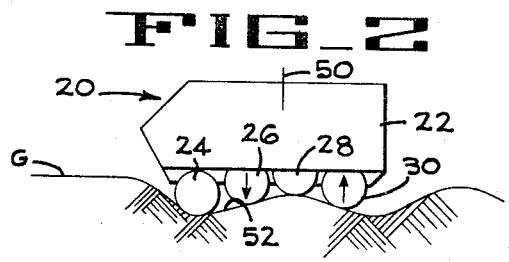
FIG_2
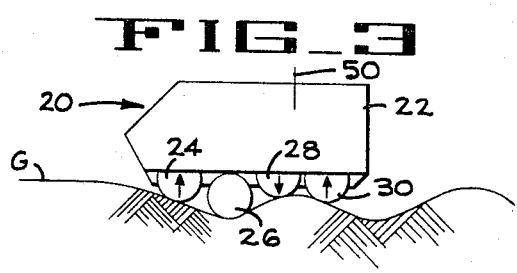
FIG_3
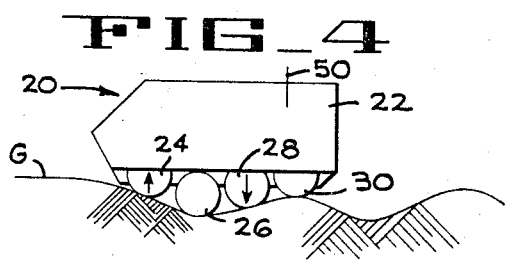
FIG_4
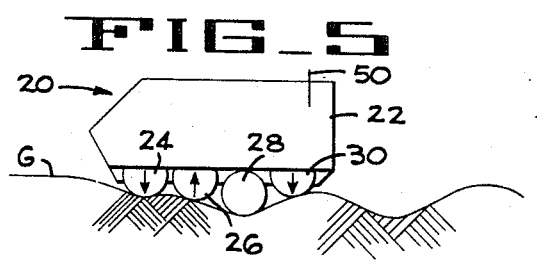
FIG_5
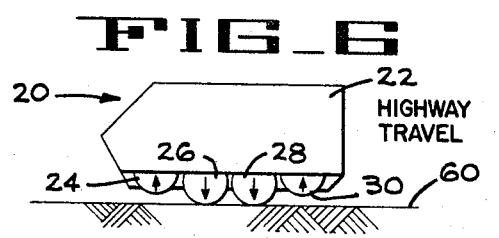
FIG_6 — HIGHWAY TRAVEL
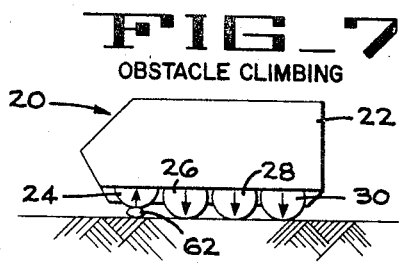
FIG_7 — OBSTACLE CLIMBING
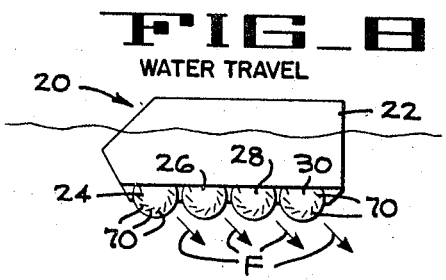
FIG_8 — WATER TRAVEL
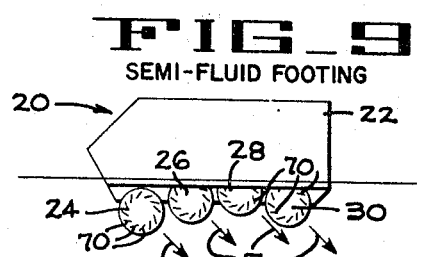
FIG_9 — SEMI-FLUID FOOTING
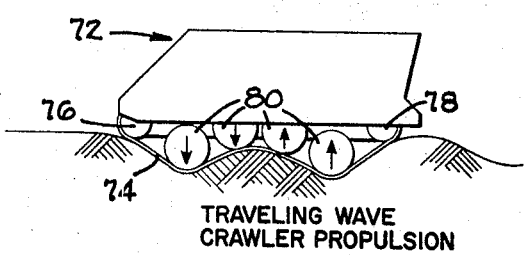
FIG_10 — TRAVELING WAVE CRAWLER PROPULSION
INVENTOR.
ARTHUR J. SLEMMONS
BY F. W. Anderson
C. E. Tripp
ATTORNEYS

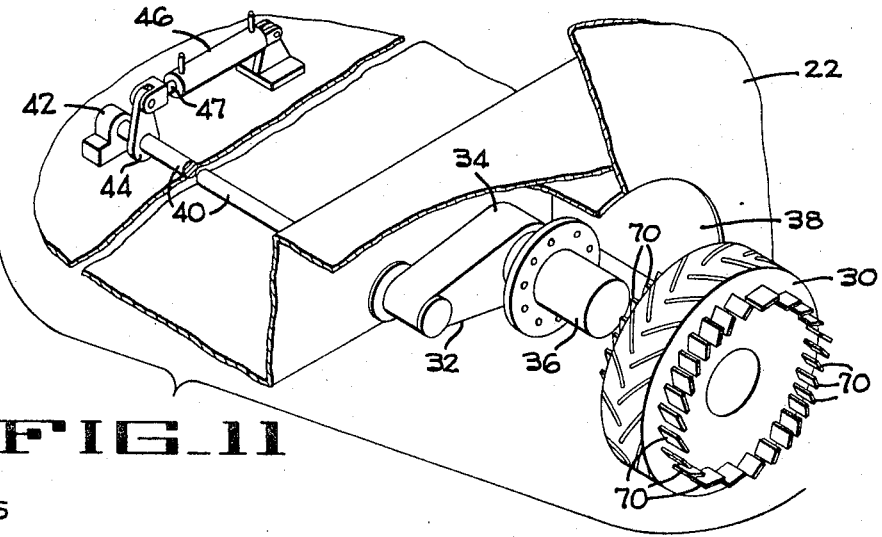
FIG_11
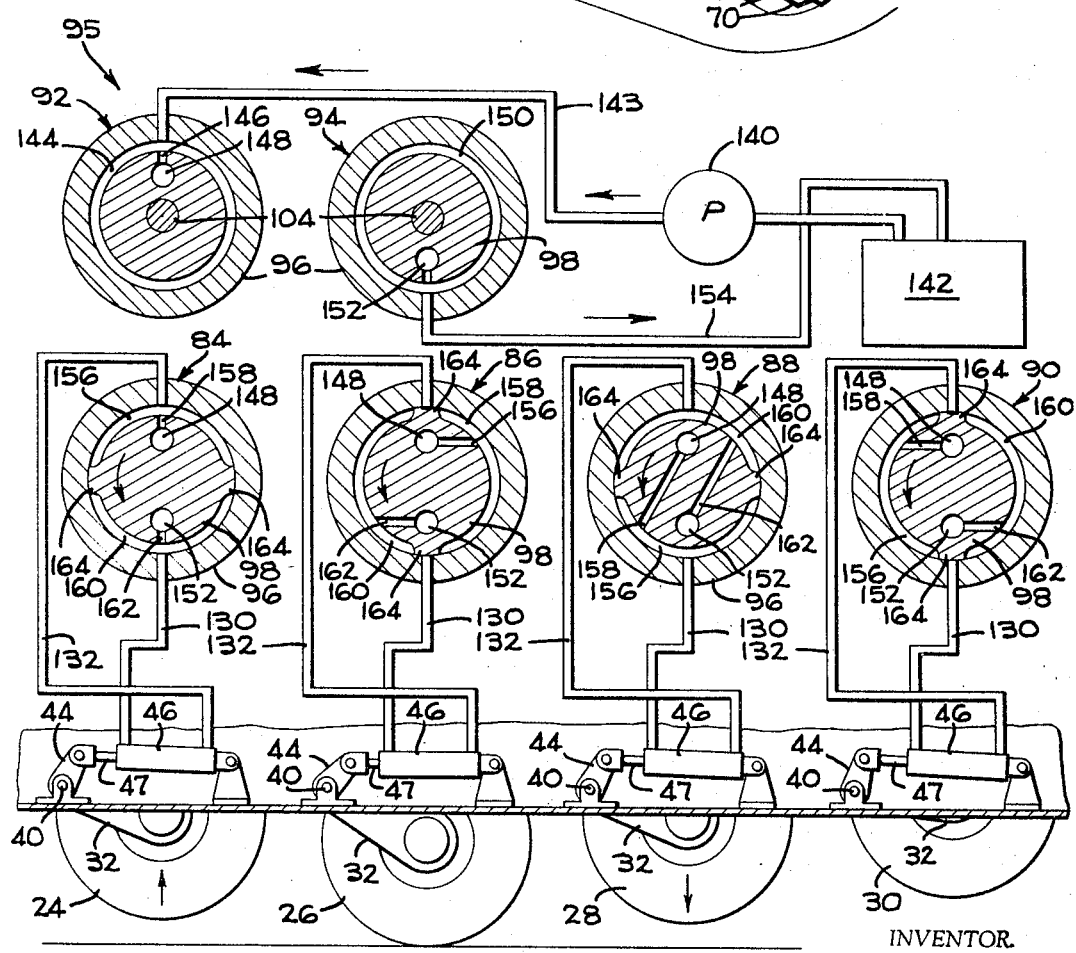
FIG_12

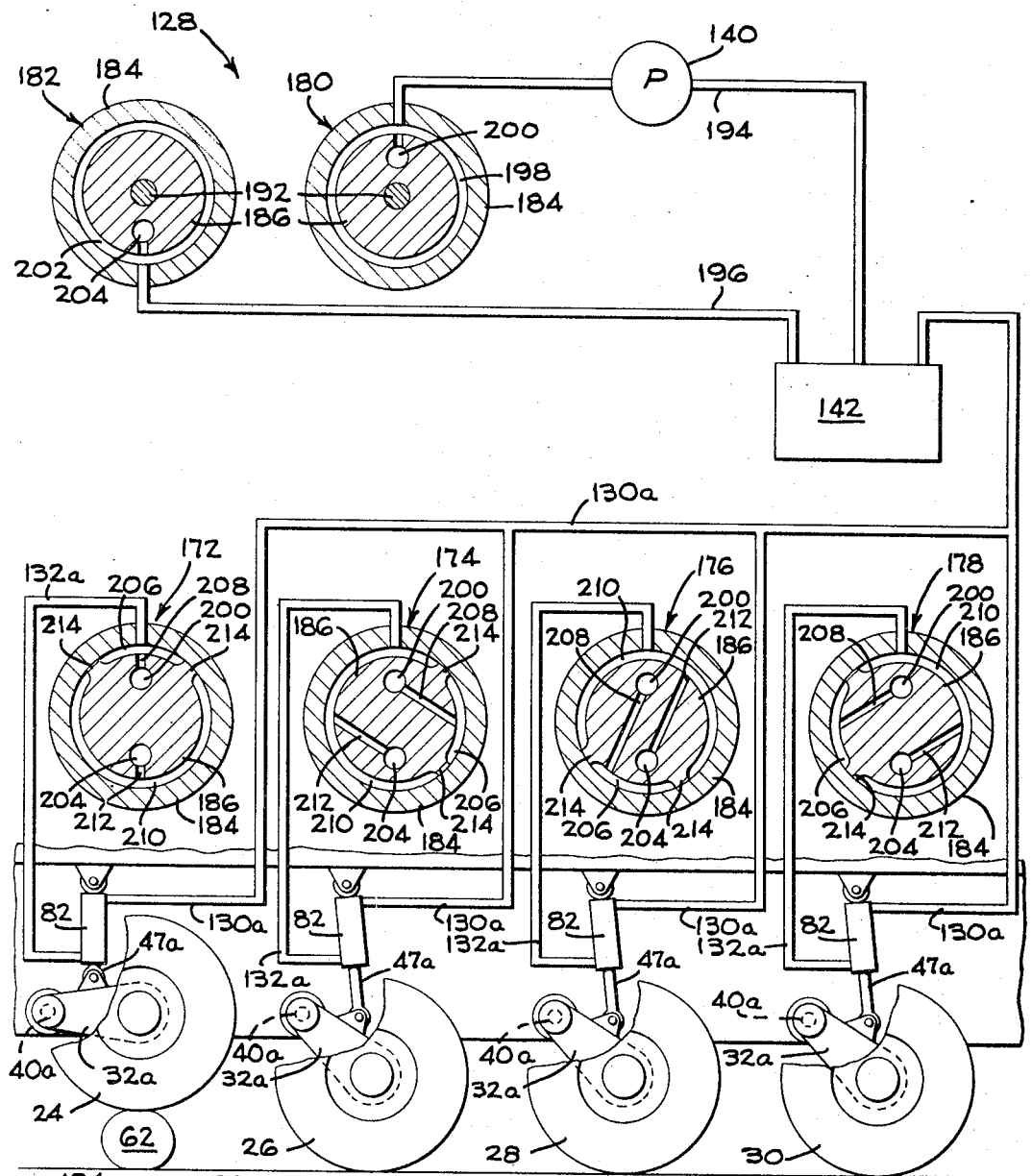

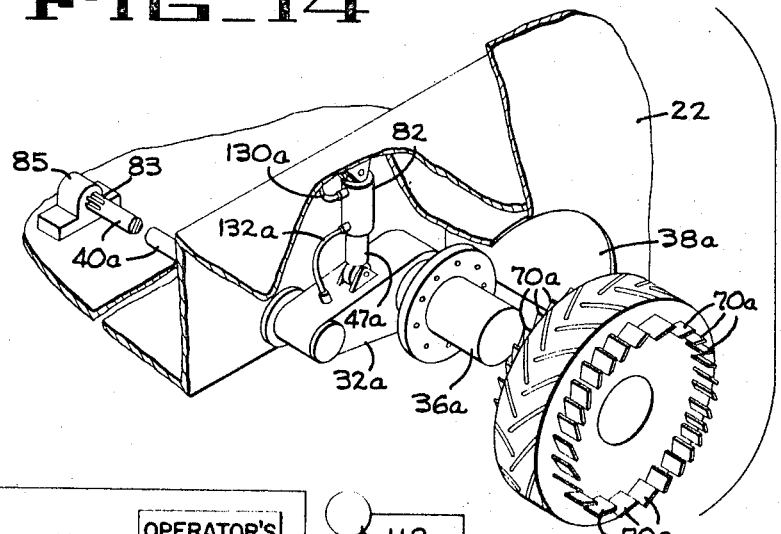
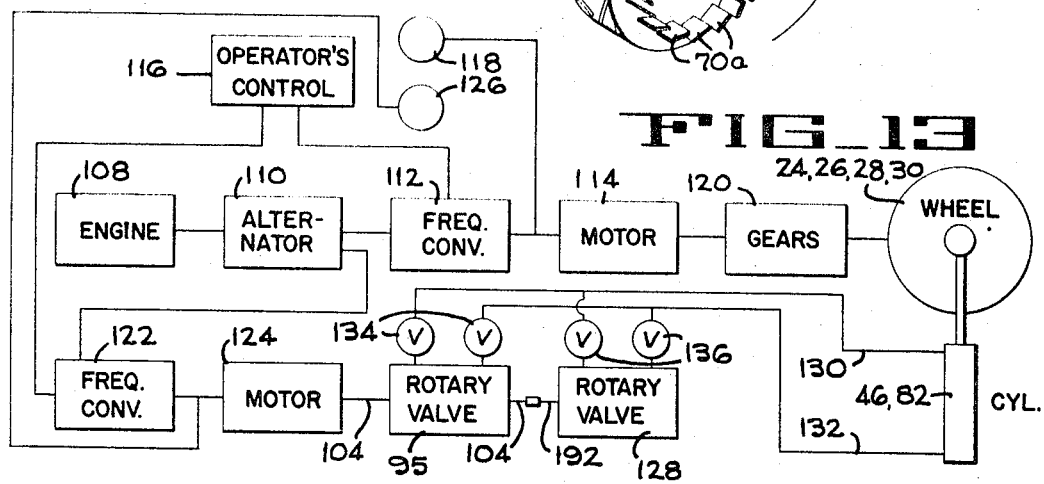
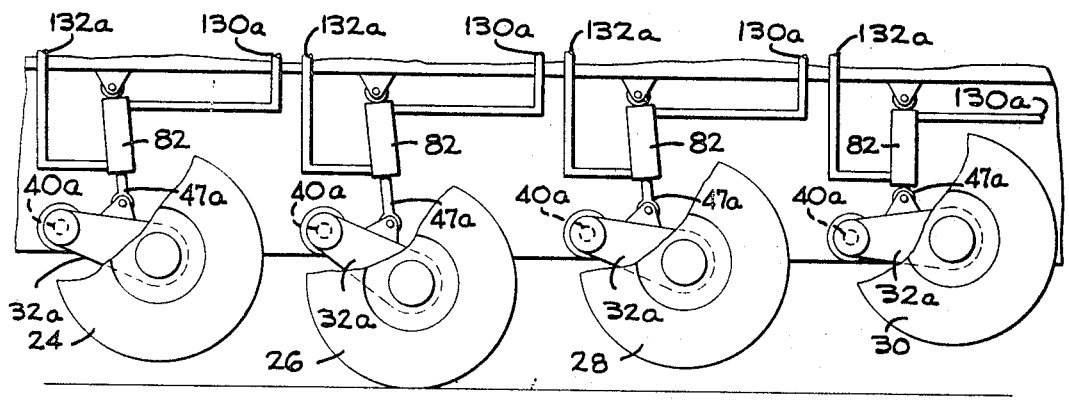

United States Patent Office 3,452,702
Patented July 1, 1969

3,452,702
VEHICLE PROPULSION SYSTEM
Arthur J. Slemmons, Los Gatos, Calif., assignor to FMC Corporation, San Jose, Calif., a corporation of Delaware
Filed Sept. 5, 1967, Ser. No. 665,576
Int. Cl. B60f 3/00; B62d 55/00, 3/00
U.S. Cl. 115—1
22 Claims

ABSTRACT OF THE DISCLOSURE

An amphibious vehicle is provided with individually driven pneumatic support wheels each having cyclically variable suspension means which can be programmed so that the axes of rotation of the wheels at each side of the vehicle describe a sinusoidal wave train which travels relative to the vehicle. This traveling wave motion is effected, in a preferred embodiment of the invention, by varying the spring loading of each wheel, or by directly moving each wheel suspension arm in a modified form of the invention. The traveling wave movement produces a propelling force component additive to the rotational propelling force of the individual wheels when the vehicle is in mud, sand or similar substances providing poor traction. Other aspects of the invention are the capability of using circular arrays of hydrofoil blades carried by the wheels for water propulsion, selective programming of the wave motion so that the vehicle can traverse a smooth surface with all wheels in a common plane or climb obstacles such as logs and small embankments, provision for reverse rotation of each set of wheels to effect skid steering when one set of wheels is reversed or for braking when both sets are reversed, and a modified form of vehicle employing traveling wave-motion bogey wheels and endless crawler tracks which move with sinusoidal motion over the bogey wheels.

Background of the invention

The general field to which the present invention is directed is in military vehicles, particularly armored, amphibious military vehicles of either the type supported by wheels or the type supported by crawler tracks.

Prior art vehicles of the type referred to above, as well as land vehicles including a hybrid or half-track using both wheels and a crawler track, have definite spheres of operation for which they are most suitable. A military need is apparent for an amphibious vehicle which combines the economy of operation and maintenance, the reliability, quietness, and smooth ride of wheel supported vehicles with the mobility of a crawler track vehicle. Obstacles which have prevented the use of support wheels instead of crawler tracks for heavy, armored vehicles are the problems of ground flotation and traction, both of which functions seriously limit the mobility of wheel-supported vehicles on all but relatively firm support surfaces. Consequently, wheel supported vehicles are most sufficient at high speed under conditions approaching highway travel. On the other hand, crawler track supported vehicles are relatively inefficient under similar conditions because of the speed limitation imposed by the tracks themselves if reasonable wear limits are to be expected, and other reasons which are well known in the art.

One prior art attempts to combine some of the desirable features of heavy, armored, track-supported vehicles and wheel-supported vehicles is found in the patent to Sfredda, No. 2,786,540. In an effort to provide adequate traction, and a smooth ride, the patentee provides noncircular driven wheels which are phased to maintain a mean ground contact line that is parallel to the bottom of the vehicle. In soft ground or sand, for instance, the angular segments of the wheels penetrate the support material and provide a positive thrust reaction against the ground. While a vehicle according to this concept might attain certain advantages, the noncircular wheels present structural difficulties and impose strict limitations on top speed capability because the wheel masses must be vertically reciprocated at all times.

Summary of the invention

Applicant's invention distinguishes over prior art structures of the same general type in providing driven pneumatic support wheels and tires having individual suspensions which, when the vehicle is traveling in mud, clay, sand or other materials that normally inhibit traction, are hydraulically conditioned by loading and unloading their individual springs (or in another form of the invention by directly powering each wheel suspension for vertical movement) in a cyclically repetitive pattern. This programmed movement causes the wheels in each set of wheels to generate a sinusoidal wave train which travels relative to the vehicle. Just as the wave train induced in a rope anchored at one end and vertically snapped at its free end can be visualized as reacting against the air, the wheels react against the support surface for the vehicle and thrust the vehicle forward with a force additive to the rotational force of the driven support wheels. A modified form of the invention provides bogey wheels, instead of the pneumatic wheels and tires, and an endless driven crawler track trained around the bogey wheels. A similar moving wave is induced in the lower flight of the crawler track, by vertically reciprocating the bogey wheels to provide traveling wave train thrust in addition to the tractive force of the driven crawler track. For travel upon firm, relatively smooth surfaces, the pneumatic wheels can be locked in a position maintaining all or selected wheels in a common plane. If an obstacle such as an embankment must be traversed, the wheel reciprocating mechanism can be set in motion so that each wheel in turn will surmount the obstacle. For water travel, hydrofoil blades on the tires can be used to provide hydrodynamic thrust. A further provision is the capability of reversing or providing a relative speed difference of one set of wheels relative to the other for steering or braking purposes in water and on land.

The wheel type vehicle suspension system herein disclosed provides optimum high speed travel under all of the above noted conditions on high flotation, high traction tires of known type, or upon tires equipped with hydrofoil blades as disclosed in my United States Patent No. 3,310,020, which is assigned to the assignee of the present invention.

Brief description of the drawings

FIGURES 1–5 are schematic side elevations of a vehicle progressing through mud, sand or the like, with traveling wave train propulsion in addition to the normal propelling force due to wheel rotation.

FIGURE 6 is a schematic elevation of the vehicle shown in FIGURES 1–5, but with all of the wheels locked at fixed elevations, for high speed road travel and skid steering using the central four support wheels.

FIGURE 7 is a schematic elevation showing how the support wheels may be sequentially raised to clear an obstacle.

FIGURE 8 illustrates water travel with the vehicle depicted in FIGURES 1–7 and illustrates hydrofoil propulsion blades which are integral with the tires but have been eliminated from the preceding figures for clarity.

FIGURE 9 is a schematic elevation similar to FIGURE 8, but with the vehicle using both traveling wave train propulsion and wheel propulsion by the hydrofoil blades in semifluid material such as mud.

FIGURE 10 is a schematic side elevation of a vehicle embodying a modified form of the invention wherein the bogey wheels of a crawler track are actuated to produce a traveling wave train in the lower flight of the track.

FIGURE 11 is a schematic elevation of a typical wheel and suspension unit.

FIGURE 12 is a schematic hydraulic circuit for cyclically raising and lowering the wheels at one side of the vehicle.

FIGURE 12A is a schematic elevation, partly broken away, of a power-driven hydraulic control valve which governs traveling-wave motion of the wheels of the vehicle.

FIGURE 13 is a block diagram of the power train and control mechanism for moving the wheels and wheel suspension mechanisms of the vehicle.

FIGURE 14 is a schematic elevation similar to FIGURE 11, but illustrating a modified typical wheel and suspension unit.

FIGURE 15 illustrates part of a hydraulic circuit, similar to FIGURE 12, for cyclically raising and lowering wheels having the type of suspension shown in FIGURE 14.

FIGURE 16 is a schematic hydraulic circuit which is incorporated with the hydraulic installation of FIGURE 15, but is used in lieu thereof to cause the wheels to successively elevate over a fixed obstacle.

*Description of the preferred embodiments*

A representative type of military vehicle which can advantageously use the wheel support system of the present invention is an armored, amphibious personnel carrier 20, FIGURE 1. This type of vehicle, some of which are equipped with crawler tracks, are used for a variety of purposes under many different field conditions, including the ferrying of supplies to beachheads, and for overland transportation which may include travel through swamps, canals, rice paddies, mudbanks and so forth, in addition to road or highway travel.

As schematically shown in FIGURE 1 for only one side of the vehicle 20, the hull 22 is supported at each side by a front pneumatic wheel 24, intermediate wheels 26 and 28, and a rear wheel 30. Each wheel is individually sprung as illustrated in FIGURE 11 for the rear left wheel 30. The wheel 30 is mounted on the free end of a suspension arm 32 having an enlarged end portion 34 which encloses a reversible electric drive motor, not shown. The wheel motors are powered by means including an engine-driven generator in the hull, and the driver's controls permit one set of wheels to be rotated at any speed and in either direction relative to the other set of wheels. This provides skid steering, braking and directional control of the vehicle.

The drive motor in the arm portion 34 powers a wheel mounting hub 36 to which the wheel 30 is removably attached. The suspension arm 32 is secured to the free end of a torsion bar 40, thus mounting the wheel for up and down swinging movement in an arcuate wheel-well 38 of the hull 22. Extending inboard across the bottom portion of the hull, the torsion bar 40 is rotatably mounted in a bearing 42 adjacent a crank arm 44 that is secured to the torsion bar. The torsion bar is selectively, rotatably positionable by a double-acting power cylinder 46 having a piston rod 47 coupled to the crank arm to elevationally adjust the position of the associated wheel relative to the hull 22.

For convenience in terms, this adjusting action is later referred to in the specification and claims as adjusting the preload of the wheel suspension. A basis for this definition is that if the vehicle is supported upon an unyielding surface, rotative adjustment of the torsion bar does in fact alter the preload of the torsion bar, and hence alters the preload of the wheel suspension. However, if less than the total number of wheels can support the vehicle, for example in mud, adjusting the suspension preload of one of the wheels can cause that wheel to sink into the mud without changing the attitude of the hull.

By means of the later-described hydraulic control circuit shown in FIGURE 12, the power cylinders 46 for the wheels 24, 26, 28 and 30 are capable of being simultaneously actuated in different phase relation so that the axes of rotation of the wheels follow a sinusoidal path when the vehicle traverses somewhat fluid or unstable support surfaces such as mud, sand, soft earth, or other soft material in which the vehicle would normally become mired, or which may be so fluid that wheel rotation alone will not propel the vehicle. This traveling wave or undulating motion effects an endwise thrust to the vehicle, in addition to the normal thrust provided by whatever frictional engagement is attained by the wheels if rotated by their individual motors.

The FIGURE 11 mechanism described above is one convenient manner of obtaining traveling wave motion for the wheels, and results from cyclically changing the preload on the torsion bars 40. The functional effect of cyclically adjusting the rotative positions of the torsion bars 40 in this manner for the wheels 24, 26, 28 and 30 is diagrammatically shown in FIGURES 1–5, and causes the vehicle to advance in the direction of the arrow 48 relative to the common vertical reference line 50.

The wheels laterally aligned with the wheels 24, 26, 28 and 30 move in synchronism with the latter wheels, and in FIGURE 1 the illustrated position of the vehicle is following a previous wave propulsion cycle advancing the vehicle over the ground line G. From the position in FIGURE 1 the vehicle advances relative to the vertical reference line 50 with the traveling wave motion cycle that is shown in FIGURES 1–5, following which the same cycle repeats continuously.

The torsion bar suspension for the wheel 24 (FIG. 1) is at this portion of the traveling wave cycle preloaded as a result of actuation of the power cylinder 46 (FIG. 11) to rotate the torsion bar 40 clockwise and cause the wheel 30 to move to its maximum downward position relative to the hull 22. The same is true of the wheel 30 (FIG. 1). At the same time, the torsion bar suspensions for the wheels 26 and 28 are in cyclical positions placing these wheels near their maximum upward positions. It is assumed, of course, that the combined flotation afforded by the wheels will maintain the hull 22 in the position illustrated. Since the wheels 24 and 30 cannot elevate that side of the hull, they thus depress the ground surface G. The ground surface intermediate the wheels 24 and 26 is considered to be somewhat resilient and thus to have resumed some of its original profile after having been traversed by the wheel 24. Following the wheel positions shown in FIGURE 1, the wheels 26 and 30, FIGURE 2, are moved respectively downward and upward as indicated by the directional arrows thereon, due to power rotation of their respective torsion bars. It will be apparent that the wheel 26, in pressing into the sloping ground surface 52 intermediate the wheels 24 and 28, will produce a forward thrust component to the vehicle.

The thrust terminates for the wheel 26 when it attains its FIGURE 3 position, at or about which time the wheel 24 retracts upward and the wheel 28 begins moving downward toward its FIGURE 4 position to continue the thrust just terminated for the wheel 26. When the thrust terminates for wheel 28 as it reaches its FIGURE 5 position, the wheels 24 and 30 move down to their FIGURE 1 positions and the set of wheels repeats the same cycle.

It will be evident that the travel of the wave defined by the axes of the wheels must usually tend to be slightly faster than the forward speed of the vehicle in order to obtain any useful thrust. Accordingly, the vehicle is designed so that the wave frequency can be varied in proportion to the speed of the vehicle so that the traveling wave motion tends to slightly exceed the vehicle speed at any rate of travel.

For highway travel, the front and rear transverse pairs of wheels can be elevated out of ground contact, such as is indicated in FIGURE 6 wherein the wheel 24 and the wheel 30 are above the surface 60 of the roadway. The elevated wheel positions are exaggerated for clarity to indicate that only the central two pairs of roadwheels provide primary support because steering is effected by retarding or advancing the speed of one set of wheels, left or right, relative to the other set of wheels.

A second advantage of the FIGURE 11 torsion bar structure is that all wheels can be simultaneously adjusted relative to the hull 22, thus altering both the ground clearance and the wheel travel. This flexibility in adjustment of the vehicle suspension can be carried out while the vehicle is in operation. When the wheels are moved downward, the vehicle has optimum capability in high speed, off-the-road travel. When the wheels are retracted into the wheel wells 38 (FIG. 11) maximum pumping action is obtained from the hydrofoil pneumatic tires previously mentioned.

When the vehicle 20 is upon a firm support surface, as shown in FIGURE 7, it can be made to surmount obstacles in the nature of short embankments such as rice paddy dikes, or as illustrated, a log 62. This climbing capability results from use of the later described hydraulic control circuit shown in FIGURE 16, by which means the successive front to rear pairs of wheels are raised as they arrive at a fixed point on the ground. Thus, the rotational speed of the wheels and the frequency of the traveling wave can be adjusted and controlled so that at any vehicle ground speed each transverse pair of wheels will lift as they traverse the same fixed point on the ground.

When the vehicle 22 is floating as shown in FIGURE 8, primary propulsion is by means of hydrofoil blades 70 which project laterally from and rotate with the pneumatic tires on the wheels. The hydrofoil blades, which have been omitted from all but FIGURES 8 and 9 for clarity, are schematically illustrated in FIGURE 11 and are in accord with the disclosure of Patent No. 3,310,020.

As set forth in the patent, the hydrofoil blades 70 perform in the manner of a radial flow pump and lift and propel the vehicle in water by inducing both lift and thrust forces acting on the hull of the vehicle. Thus the combined force vector or the direction in which water is pumped by the hydrofoil blades is diagonally downward and rearward, approximately as indicated by the force vector lines F, FIGURE 8. The pumping action is made most efficient when the wheels are retracted up into their respective wheel wells, as previously mentioned, because the water flow is then primarily in the direction of the force lines F.

It is also possible to utilize the moving wave propulsion system in conjunction with the hydrofoil blade propulsion as schematically indicated in FIGURE 9. If the vehicle is in mud or similar substance which will neither provide free flotation for the hull nor sufficient traction for the wheels, the combined hydrofoil blade propulsion and traveling wave propulsion assures mobility of the vehicle where most other vehicles of similar type may become completely immobilized.

The traveling wave propulsion system is also contemplated for a conventional amphibious vehicle 72 (FIG. 10) equipped with crawler tracks. The left-side crawler track 74 is trained around fixed drive and idler wheels 76 and 78, respectively, and over bogey wheels 80. Means for vertically reciprocating the bogey wheels of the vehicle 72 are the same as described for the vehicle 20, but either vehicle 72 or 20 may employ the modified wheel suspension system illustrated in FIGURE 14.

In the modified system, each wheel suspension arm 32a is directly moved by a double-acting hydraulic cylinder 82. The suspension arm 32a is connected to a torsion bar 40a which has a splined end portion 83 that is rotatively adjustable but normally locked in an anchor bracket 85 at the other side of the hull 22. Fluid under pressure is admitted to the cylinder 82 by one conduit 130a while another conduit 132a provides an exhaust communication to reservoir. The wheel hub 36a, the wheel well 38a, the hydrofoil blades 70a and the individual electric drive for each wheel are the same as previously described in connection with FIGURE 11. It should be mentioned that in the case of a tracked vehicle, the bogey wheels do not require any drive connections or individual motors.

Although there are several possible power arrangements for inducing the wave motion of the support wheels, such as electrical and electromechanical power mechanisms, hydraulically operated suspension controls and power mechanisms are preferred from a standpoint of efficiency, cost, reliability and ease of installation and maintenance.

The individual power cylinders 46 (FIG. 12) of the wheels 24, 26, 28 and 30 are respectively controlled by valve segments 84, 86, 88 and 90, which together with a valve inlet segment 92 and a valve outlet segment 94 are part of a rotary control valve assembly 95 (FIGS. 12A and 13) for one set of wheels. Similar valve segments for the other set of wheels are included in the same assembly, but are omitted from FIGURE 12A. The control valve 95 includes a hollow cylindrical housing 96, a one-piece rotor 98, and nonrotatable end caps 100 and 102 which are respectively adjacent the inlet segment 92 and the outlet segment 94. The valve segments 84, 86, 88, 90 and 92 are hydraulically isolated from one another and from the end caps 100 and 102 by O-rings 97 which are seated in circumferential grooves of the rotor 98. Each end of the rotor 98 has a projecting shaft 104 that is rotatably mounted and sealed in one of the end caps. The control valve 95 has a variable-speed power drive, presently described, so that the rotor 98 revolves at a speed proportionate to the speed of the vehicle.

Electric power for the vehicle 20 originates with an engine 108 (FIG. 13) that drives an alternator 110. Coupled to the alternator is a frequency converter 112 that governs the frequency of the voltage applied to a frequency-controlled wheel motor 114 to control the speed of the wheel motor. The converter 112 is governed by an operator's control 116. A dial 118 indicates figures which correspond to the frequency applied from the frequency converter 112 to the wheel motor 114, and hence the speed of the motor, for a purpose to be presently described. The wheel motor and a reduction gear train 120 provide rotational power for the one of the wheels 24, 26, 28 or 30. The drive motor and gear train of each of the vehicle wheels are coupled to the frequency converter 112 in the same manner.

The operator's control 116 also governs a frequency converter 122 which is powered by the alternator 110 and regulates the frequency of the voltage applied to a valve motor 124. A dial 126 is physically adjacent the dial 118 so that both dials are in view of the operator, and the dial 126 displays numerals which correspond to the frequency supplied by the frequency converter 122 to the valve motor 124. Valve motor 124 is mechanically coupled to one of the shafts 104 of the rotary valve 95, and the other shaft 104 drives a similar rotary valve 128 that is later mentioned in connection with FIGURE 16. The respective functions of the rotary valves 95 and 128 are to program the traveling wave motion of the vehicle wheels, and to program the successive lifting motion of the vehicle wheels to surmount a fixed obstacle. The rotors of both valves are continuously driven, but the valves are alternatively operative to actuate the wheel suspension arm cylinders 46 (FIGS. 11 and 12).

Because the speed of the wheel motors 114 (FIG. 13) and the speed of the valve motor 124 vary according to the frequency of the voltage applied, as governed by the operator's control 116, the dials 118 and 126 show the speed differential between the rotary speed of the transverse pairs of wheels 24, 26, 28, 30, and the traveling wave motion controlled by the rotary valve 95. It is thus possible for the operator to adjust the traveling wave frequency of the wheels relative to either the ground speed of the vehicle or to the rotational speed of the wheels. This is an important aspect of the invention because the tractive force due to wheel rotation varies according to the composition of the material which the vehicle is traversing. Thus, the traveling wave frequency of the wheels must be at least as fast as the ground speed of the hull, but not necessarily in direct relation to the peripheral speed of the wheels.

The rotary valve 95 (FIG. 13) which controls the traveling wave cycle motion transfers hydraulic fluid to and from the wheel suspension cylinders 46 through a conduit 130 and a conduit 132, each of which is controlled by a remotely operable on-off valve 134. Similar valves 136 control the flow for the rotary valve 128 which programs wheel lifting motion to clear obstacles. When the valves 134 are open, the valves 136 are closed, and vice versa.

Returning to FIGURE 12, and assuming that the traveling wave cycle motion is in operation, a hydraulic pump 140 is drawing hydraulic fluid from a sump or reservoir 142 and transferring the fluid through a conduit 143 to the valve inlet segment 92. By means of an annular groove 144 that circumscribes the rotor 98, fluid under pressure is transmitted through a radial port 146 that communicates with the groove and into a common inlet manifold 148 that serves all of the valve segments except the valve segment 94. Similarly, an annular groove 150 for the valve outlet segment 94 communicates with a common outlet manifold 152 that serves all the valve segments, except the valve segment 92, and transmits fluid back to the reservoir 142 through a pipe 154.

Each valve segment 84, 86, 88 and 90 is provided with a peripheral groove 156 that communicates through a lateral port 158 with the inlet manifold 148, and a peripheral groove 160 that communicates through a lateral port 162 with the outlet manifold 152. The grooves 156 thus always transfer fluid to the wheel cylinders 46, and the grooves 160 always transfer fluid from the wheel cylinders back to the reservoir 142. The rotor 98 has radial ribs 164 which isolate the grooves 156 and 160 of each valve segment from each other.

The cylinder 46 for the wheel 24, at the portion of the wave cycle illustrated, is about midway in the time interval during which its base portion is pressurized from the inlet manifold 148 through the conduit 132 to project the piston rod 47. Therefore, the torsion bar 40 for the wheel 24 is being rotated counterclockwise as viewed in FIGURE 12, and the wheel suspension arm 32 and the wheel 24 are being elevated toward the hull 22. Wheel 26, meanwhile, is locked temporarily in its maximum downward position since the conduit 130, just prior to the position illustrated, communicated with the piston rod end of the cylinder 47 for the wheel 26, following which both rotor ribs 164 for the valve segment 86 moved into flow-blocking positions for pipes 130 and 132. Wheel 26 will next move upward in lagging relation to the upward movement of the wheel 24 because of the different phase relation of the valve segments 84 and 86.

The wheel cylinder 46 for the wheel 28 is about midway through a cycle in which its piston rod 47 is being retracted. Accordingly, the wheel 28 is moving downward relative to the hull. Wheel 30 is temporarily in its maximum upward position, but will proceed downward while the adjacent wheel 28 is moving downward.

Apart from the cyclical wave motion effected by the continued rotation of the valve rotor 98 and the different phase relation of the valve segments 84, 86, 88 and 90, it is important to note that each wheel, although it may be moving or temporarily locked, is still resiliently upwardly displaceable if it should be urged in that direction with a force sufficient to further twist its torsion bar spring 40. Consequently, the hull 22 will maintain maximum stability both longitudinally and transversely because the torsion bars 40 damp any tendency of the hull to pitch or roll.

A second convenient manner in which the wheels can be actuated in repetitive traveling wave cycles is by means of the previously mentioned apparatus shown in FIGURES 14 and 15. In this system, the wheel cylinders 82 for the wheels 24, 26, 28 and 30 are provided with inlet-outlet pipes 130a and 132a that correspond in function to the pipes 130 and 132, and which may be programmed by the same rotary valve 95 already described. As compared to the FIGURE 12 suspension system, this system may be at times less desirable because the wheel suspension arms 32a are directly coupled to the cylinders 82. This can cause more pitch and roll of the hull 22 on hard ground, since the wheels under these conditions are unsprung due to the fact that the cylinders 82 can "lock out" the torsion bar springs 40a.

The rotary valve 128 (FIG. 13) for successively lifting the wheels over a fixed obstacle such as the log 62 (FIG. 16), is placed in operation by closing the valves 134 which control the traveling wave cycles, and opening the valves 136. This valve switching operation is remotely effected by the operator of the vehicle after he slowly advances the vehicle 20 until the front wheels 24 contact the obstacle. Upon resuming forward movement of the vehicle, the transverse pairs of wheels 24, 26, 28 and 30 successively "climb" over the obstacle without appreciably disturbing either the lateral or longitudinal attitude of the hull 22. Although this climbing capability is described and illustrated as being specifically used with the modified suspension system in which the suspension arms 32a are directly powered, its application to the preloaded torsion bar type of wheel suspension system is similar and will be obvious.

The individual power cylinders 82, when the valves 136 are open, are respectively controlled by valve segments 172, 174, 176 and 178. The valve 128 comprises the above-mentioned valve segments, a valve inlet segment 180, a valve outlet segment 182, a hollow cylindrical housing 184, a one-piece rotor 186, and nonrotatable end caps that respectively enclose the rotor 186 within the housing 184. Projecting end shafts 192 of the rotor 186 are rotatably mounted in the end caps, and one shaft, as shown in FIGURE 13, is coupled to and driven by the shaft 104 of the rotary valve 95.

The same previously mentioned pump 140 and sump 142 are connected to the rotary valve 128, but by different pressure and return lines 194 and 196, respectively. The rotor 186 in the plane of the valve segment 180 is provided with a circumferential groove 198 that supplies an inlet manifold 200 which extends longitudinally through the rotor and is common to all of the valve segments except the segment 182. Similarly, the portion of the rotor 186 in the valve segment 182 is provided with a circumferential groove 202 that communicates with an outlet manifold 204 which is common to all of the valve segments except the segment 180.

Each valve segment 172, 174, 176 and 178 is provided with a short peripheral groove 206 that communicates with the inlet manifold 200 through a lateral passage 208 in the rotor, and is provided with a longer peripheral groove 210 that communicates with the outlet manifold 204 through a lateral passage 212. Radial ribs 214 isolate the grooves 206 and 210 from one another in the plane of each valve segment.

The operator regulates the frequency converters 112 and 122 so that the dials 118 and 126 indicate a speed differential between the wheel motors 114 and the valve motor 124 at which the wheel cylinders 82 will elevate each wheel in turn as it passes a fixed point on the ground. In this case, the fixed point is the log 62. Thus, the wheel 24 is at midpoint in its highest dwell position wherein the groove 206 of the valve segment 172 has pressurized, and will continue to pressurize, the piston rod end of the cylinder. The piston rod 47a is therefore in its maximum retracted position in which the wheel arm 32a has pivoted upward about the axis 40a and lifted the wheel.

The wheels 26, 28 and 30 are in their common maximum down position since the inlet grooves 206 were formerly in communication with the respective wheel cylinders 82 to extend their piston rods 47a. Each outlet groove 210 now being in communication with a wheel cylinder through one of the lines 132a, the individual wheels 26, 28 and 30 are suspended directly from the torsion bars 40a because the hydraulic fluid in the cylinders is free to return to the reservoir 142 through the outlet manifold 204 and the return line 196.

The phase relation of the valve segments 172, 174, 176 and 178, as controlled by the operator in the manner previously described, is such that when the vehicle has advanced the wheel 24 beyond the obstacle 62, the outlet groove 210 will be in communication with the piston rod end of the cylinder 82 for that wheel. The preload or twist of the torsion bar 40a thus returns the wheel 24 into ground contact, following which the wheel 26 will follow the same control pattern in elevating over the obstacle and returning into ground contact, and so forth with each wheel in turn surmounting the obstacle.

This obstacle climbing feature of the invention has special utility when the vehicle is being propelled by wheel rotation through mud or the like, where the tractive force may be so marginal that even a relatively small obstacle will stop the vehicle. Thus, the fact that the wheels cannot of their own power climb over the obstacle is usually immaterial because the wheels can be retracted either clear of the obstacle, or to an elevation in which the propelling motion of the vehicle may be sufficient to carry the wheel over whatever part of the obstacle may still impede the forward motion of the vehicle.

There are other tractive advantages which are not herein illustrated, but which should be mentioned because they result from the capability of altering the vehicle ground clearance as mentioned in connection with the apparatus shown in FIGURES 11 and 12. If the ground clearance is adjusted so that the wheels 24, 26, 28 and 30 are at their maximum distance from the hull 22, the ground contact line can be either sharply concave or convex. Thus, in the case of the vehicle crossing a deep ditch wider than the length of the vehicle, the wheels can maintain full ground contact over the convex crest at the near and far sides of the ditch, and also maintain full ground contact over a deeply concave bottom portion of the ditch. Moreover, the vehicle 20 can maintain relatively high speed over very rough terrain without structural damage because of the rugged trailing arm wheel suspension and skid steering that eliminates the more fragile and complex suspension arrangements common to steerable-wheel systems.

It is to be understood that the two systems herein disclosed for effecting traveling wave propulsion by moving the wheels in a wave pattern producing forward thrust for the vehicle are by way of example only, and that the inventive concept of traveling wave motion propulsion with circular wheels or a crawler track can be effected in various wave patterns and by different power systems and wheel suspensions. It will also be evident that reverse thrust by traveling wave motion and wheel lifting during reverse movement of the vehicle can be accomplished by reverse rotation of the rotary valves 95 and 128.

Although the best mode contemplated for carrying out the present invention has been herein shown and described, it will be apparent that modification and variation may be made without departing from what is regarded to be the subject matter of the invention as set forth in the appended claims.

Having completed a detailed description of the invention so that those skilled in the art could practice the same, I claim:

1. In a power driven vehicle of the type having individual wheel suspension means mounting at least three circular support wheels at each side of the vehicle to form a wheel set, and means for driving at least some of said wheels; the improvement comprising power means arranged to cyclically urge the individual support wheels of each of said wheel sets upward and downward relative to the vehicle and to the next adjacent wheel in said set of wheels in a predetermined pattern so that at least one of said wheels during such movement when the vehicle is supported upon a yieldable surface presses into said surface and developes a thrust reaction force component substantially parallel to the longitudinal axis of the vehicle.

2. Apparatus according to claim 1 wherein said power means controls the cyclic movements of said wheels so that an imaginary sinusoidal curve interconnecting the axis of rotation of the wheels in each of said wheel sets describes a traveling wave train moving longitudinally of the vehicle.

3. Apparatus according to claim 1 wherein each set of wheels is provided with an endless crawler track whereby the thrust reaction force is transmitted to the crawler tracks.

4. Apparatus according to claim 1 in which said vehicle is amphibious and said power means effects a sinusoidal traveling wave train in each of said wheel sets for propelling the vehicle in water.

5. Apparatus according to claim 4 and hydrofoil blades carried by said wheels, said blades being in annular array circumscribing the axes of rotation of said wheels and projecting laterally therefrom.

6. Apparatus according to claim 1 and second power means coupled to said wheels for rotating said wheels in each wheel set in a common direction.

7. Apparatus according to claim 6 in which one set of wheels is rotatable in a reverse direction from the direction of rotation of the other set of wheels.

8. Apparatus according to claim 6 in which said second power means comprises an individual motor for each wheel.

9. Apparatus according to claim 6 in which said first and second power means are powered by a single engine and said first and said second power means are individually operable.

10. Apparatus according to claim 6 in which said wheels are provided with hydrofoil tires and said vehicle is amphibious, said first power means effecting a sinusoidal wave train in each of said wheel sets for propelling the vehicle in water, and wherein said second power means is operable independent of said first power means for propelling the vehicle both on land and in water.

11. Apparatus according to claim 6 in which said wheel sets are capable of independent rotation by said second power means to effect differential steering.

12. In a power driven vehicle of the type having individual wheel suspension means mounting at least three circular support wheels at each side of the vehicle to form a wheel set, and means for driving at least some of said wheels; and spring means individually connected to each of said wheel suspension means; the improvement comprising power means for cyclically urging the individual support wheels of each of said wheel sets upward and downward relative to the vehicle and to the next adjacent wheel in said set of wheels so that at least one of said wheels during such movement when the vehicle is supported upon a yieldable surface presses into said surface and develops a thrust reaction force component substantially parallel to the longitudinal axis of the vehicle, said power means being arranged to cyclically vary the spring preload of the individual support wheels to produce said upward and downward movement of the wheels.

13. Apparatus according to claim 12 and means for cyclically varying the spring preloads of each set of wheels so that only one wheel in each set is affected at a time.

14. Apparatus according to claim 12 wherein the vertical motions of said wheels are phased so that an imaginary sinusoidal curve interconnecting the axes of rotation of the wheels in each of said wheel sets describe a traveling wave train moving longitudinally of the vehicle.

15. Apparatus according to claim 12 wherein the spring preload of the individual wheels are varied so that the axes of rotation of each set of wheels describe a sinusoidal traveling wave which moves longitudinally relative to the vehicle.

16. Apparatus according to claim 15 in which the traveling wave velocity is substantially the same as the peripheral speed of the wheels.

17. Apparatus according to claim 15, and further including means for adjusting the traveling wave velocity relative to the peripheral speed of the wheels.

18. A vehicle comprising a hull, a plurality of pneumatic wheels supporting said hull, means mounting each of said wheels for up and down movement relative to said hull, power means individual to each of said wheel mounting means for effecting said wheel movement, and means for programming the actuation of said power means such that the wheels at each side of the vehicle delineate a traveling wave train moving longitudinally of said hull.

19. Apparatus according to claim 18 and further including a variable frequency electric motor coupled to each wheel, a main power source in said hull, an alternator mechanically driven by said power source, a frequency converter electrically connected between said alternator and said wheel motors, a power driven hydraulic valve for controlling the wave train motion of said wheels, a variable frequency electric motor in driving relation with said valve, a second frequency converter electrically connected between said alternator and said valve motor, and means for separately controlling the output frequencies of said first and second frequency converters whereby the input frequencies for said wheel and valve motors are regulated to control their respective rotational speeds.

20. A method of propelling a vehicle over a yieldable surface, said vehicle being of the type having a wheel or track suspension and individually mounting at least three wheels on each side of the vehicle, the wheels on opposite side of the vehicle forming a pair comprising the steps of, moving said wheel pairs upward and downward relative to the vehicle, and phasing the movement of said wheel pairs relative to each other such that the wheel pairs form a traveling wave train disposed longitudinal to said vehicle.

21. The method of claim 20 including the step of rotatably driving at least some of said wheels.

22. A method of propelling a vehicle over obstacles, said vehicle being of the type having a wheel or track suspension and individually mounting at least three wheels on each side of the vehicle, said wheels on opposite sides of the vehicle forming a pair comprising the steps of, driving the forward set of wheels of the vehicle up against the obstacle, automatically lifting said wheel pairs upwardly in sequence over said obstacle while driving said vehicle forwardly, and lowering said wheels on the other side of the obstacle.

References Cited

UNITED STATES PATENTS

| | | | |
|---|---|---|---|
| 3,254,738 | 6/1966 | Larsen | 180—9.2 |
| 3,414,072 | 12/1968 | Hodges et al. | 115—1 X |
| 3,238,913 | 3/1966 | Slemmons | 115—1 |
| 3,348,624 | 10/1967 | Just et al. | 115—1 X |
| 3,351,037 | 11/1967 | Meili | 115—1 |

ANDREW H. FARRELL, *Primary Examiner.*

U.S. Cl. X.R.

180—9.2, 22